United States Patent
Begeja et al.

(10) Patent No.: US 9,641,895 B2
(45) Date of Patent: May 2, 2017

(54) SYSTEM AND METHOD FOR PROVIDING PROGRAM RECOMMENDATIONS THROUGH MULTIMEDIA SEARCHING BASED ON ESTABLISHED VIEWER PREFERENCES

(71) Applicant: AT&T Intellectual Property II, L.P., Atlanta, GA (US)

(72) Inventors: Lee Begeja, Gillette, NJ (US); Charles Douglas Blewett, Madison, NJ (US); David Crawford Gibbon, Lincroft, NJ (US); Zhu Liu, Marlboro, NJ (US); Bernard S. Renger, New Providence, NJ (US); Kenneth H. Rosen, Middletown, NJ (US); Behzad Shahraray, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 14/952,158

(22) Filed: Nov. 25, 2015

(65) Prior Publication Data
US 2016/0080814 A1    Mar. 17, 2016

Related U.S. Application Data

(63) Continuation of application No. 14/196,767, filed on Mar. 4, 2014, now Pat. No. 9,232,273, which is a
(Continued)

(51) Int. Cl.
*H04N 21/466* (2011.01)
*G11B 27/10* (2006.01)
(Continued)

(52) U.S. Cl.
CPC ....... *H04N 21/4668* (2013.01); *G11B 27/105* (2013.01); *G11B 27/11* (2013.01);
(Continued)

(58) Field of Classification Search
CPC ................... H04N 21/4668; G11B 27/105
(Continued)

(56) References Cited

U.S. PATENT DOCUMENTS

| 6,112,186 A | 8/2000 | Bergh et al. |
| 6,236,395 B1 | 5/2001 | Sezan et al. |

(Continued)

FOREIGN PATENT DOCUMENTS

| CA | 2320568 A1 | 3/2001 | |
| WO | 9627840 A1 | 9/1996 | |
| WO | WO 01/15449 | * 3/2001 | ............. H04N 7/165 |

OTHER PUBLICATIONS

I. Sezan, et al., "MPEG-7 Standard and its Expected Role in Development of New Information Applicances", 2000 IEEE, pp. 274-275.
(Continued)

*Primary Examiner* — Thai Tran
*Assistant Examiner* — Mishawn Hunter
(74) *Attorney, Agent, or Firm* — Chiesa Shahinian & Giantomasi PC

(57) ABSTRACT

A system and method is disclosed for processing viewer profiles and program metadata from a number of sources to provide viewing suggestions and recommendations to one or more viewers.

15 Claims, 4 Drawing Sheets

Related U.S. Application Data continuation of application No. 10/321,694, filed on Dec. 17, 2002, now Pat. No. 8,712,218.

(51) Int. Cl.

| | | |
|---|---|---|
| *G11B 27/11* | (2006.01) | |
| *G11B 27/28* | (2006.01) | |
| *H04N 21/442* | (2011.01) | |
| *H04N 21/25* | (2011.01) | |
| *H04N 21/258* | (2011.01) | |
| *H04N 21/4147* | (2011.01) | |
| *H04N 21/45* | (2011.01) | |

(52) U.S. Cl.
CPC .......... *G11B 27/28* (2013.01); *H04N 21/251* (2013.01); *H04N 21/25891* (2013.01); *H04N 21/4147* (2013.01); *H04N 21/44222* (2013.01); *H04N 21/4524* (2013.01); *H04N 21/4532* (2013.01); *H04N 21/4667* (2013.01)

(58) Field of Classification Search
USPC ................ 386/248, 262, 291; 725/46, 58
See application file for complete search history.

(56) References Cited

U.S. PATENT DOCUMENTS

| | | | |
|---|---|---|---|
| 6,266,649 | B1 | 7/2001 | Linden et al. |
| 6,445,306 | B1 * | 9/2002 | Trovato .............. H04N 5/4403 340/12.25 |
| 6,530,083 | B1 | 3/2003 | Liebenow |
| 6,642,939 | B1 | 11/2003 | Vallone et al. |
| 6,694,515 | B2 | 2/2004 | De Bot et al. |
| 6,810,526 | B1 | 10/2004 | Menard et al. |
| 6,934,964 | B1 | 8/2005 | Schaffer et al. |
| 6,956,573 | B1 | 10/2005 | Bergen et al. |
| 7,065,777 | B2 | 6/2006 | Inoue |
| 7,174,512 | B2 | 2/2007 | Martin et al. |
| 7,185,355 | B1 | 2/2007 | Ellis et al. |
| 7,296,284 | B1 | 11/2007 | Price et al. |
| 7,337,462 | B2 | 2/2008 | Dudkiewicz et al. |
| 7,369,750 | B2 | 5/2008 | Cheng et al. |
| 7,461,055 | B2 | 12/2008 | Atcheson et al. |
| 8,230,343 | B2 | 7/2012 | Logan et al. |
| 2002/0009285 | A1 | 1/2002 | Safadi et al. |
| 2002/0035727 | A1 | 3/2002 | Numata et al. |
| 2002/0083043 | A1 | 6/2002 | Hoshi et al. |
| 2002/0174428 | A1 | 11/2002 | Agnihotri et al. |
| 2002/0184195 | A1 | 12/2002 | Qian |
| 2003/0061239 | A1 * | 3/2003 | Yoon ................ G06F 17/30017 |
| 2003/0093792 | A1 * | 5/2003 | Labeeb .................. H04N 7/163 725/46 |
| 2003/0126108 | A1 | 7/2003 | Martino et al. |
| 2003/0135857 | A1 | 7/2003 | Pendakur et al. |
| 2003/0208763 | A1 * | 11/2003 | McElhatten .......... G06F 3/0482 725/58 |
| 2003/0229900 | A1 | 12/2003 | Reisman |
| 2004/0073924 | A1 | 4/2004 | Pendakur |
| 2004/0109668 | A1 | 6/2004 | Stuckman |
| 2004/0123131 | A1 | 6/2004 | Zacks et al. |
| 2006/0053449 | A1 | 3/2006 | Gutta |
| 2006/0212904 | A1 | 9/2006 | Klarfeld et al. |
| 2006/0248558 | A1 | 11/2006 | Barton et al. |
| 2007/0028266 | A1 | 2/2007 | Trajkovic et al. |
| 2009/0310937 | A1 | 12/2009 | Ellis et al. |
| 2011/0238478 | A1 | 9/2011 | Gottfurcht et al. |
| 2012/0016934 | A1 | 1/2012 | Van Stam |

OTHER PUBLICATIONS

N. Dimitrova, et al., "Applications of Video-Content Analysis and Retrieval", IEEE Multimedia, Jul.-Sep. 2002, pp. 42-55.

* cited by examiner

SYSTEM AND METHOD FOR PROVIDING PROGRAM RECOMMENDATIONS THROUGH MULTIMEDIA SEARCHING BASED ON ESTABLISHED VIEWER PREFERENCES

This application is a continuation of U.S. application Ser. No. 14/196,767 filed Mar. 4, 2014, which is a continuation of U.S. application Ser. No. 10/321,694 filed on Dec. 17, 2002 and issued as U.S. Pat. No. 8,712,218 on Apr. 29, 2014, the disclosures of each of which are herein incorporated by reference in their entirety.

BACKGROUND OF THE INVENTION

The present invention relates generally to systems and methods for providing program recommendations and more particularly to systems and methods for providing program recording recommendations from multimedia searching based on viewer profiles.

Recently, Digital Video Recorders, also known as Personal Video Recorders have begun to gain in popularity with consumers. Much like the impact that video cassette recorders (VCR) made when first introduced, these devices provide an even easier and more powerful way for consumers to record programs and watch them at a later time.

Digital video recorders are desirable because they are more robust and feature laden than conventional VCRs. For example, digital video recorders have the capability of concurrently recording incoming streaming video data using storage drive technology and playing back previously recorded video data. As currently available, a digital video recorder receives incoming streaming video data from the output interface of a standard set-top box configured to receive the broadcast signals from a multiple-service operator (MSO), such as a cable provider. These digital video recording devices are also a potentially valuable source of user programming information since they can be uniquely identified in a network and have two-way communication capabilities.

As powerful as these digital video recording devices are, the burden still lies with the consumer to keep track of current programs and to record the programs of interest to them. For example, the consumer typically has to navigate any printed or electronic guides to determine which programs to record and then the consumer has to program the recording device to record the desired programs. Furthermore, these conventional programming guides are also difficult to navigate and given the ever increasing variety of programming available, it has become quite cumbersome to actually find programming which is of interest to the viewer.

Accordingly it would be desirable to have a more robust recommendation system and method which efficiently and effectively collects viewer preference information and can provide viewers program recommendations by multimedia searching programming content.

SUMMARY OF THE INVENTION

The present invention is a system and method for determining and providing program recommendations based on correlations between information from multimedia searching of programming content/metadata and viewer profiles which indicate certain preferences for types and kinds of programming. Program metadata may be derived from multimedia information or automatically derived, for example, in real time from event information that may be occurring in the world at large. Additionally program information may be garnered by automatically analyzing the program video or multimedia information to derive the metadata. In one embodiment of the present invention, future programming selections are reviewed utilizing metadata available for the future programming selections. Weighting algorithms and selection schemes are applied to determine which program selections are suitable for which viewer and then recommendations based on the selection process are provided to the viewer(s).

In one embodiment, the present invention is a method comprising accessing a profile associated with the video recording device, receiving metadata associated with a plurality of programs, processing the metadata to select one or more of the programs based on the accessed profile and providing one or more program recommendations for recording on the video recording device.

In another embodiment, the present invention is a method for providing program recommendations comprising reviewing a plurality of future program selections, accessing profiles associated with a plurality of viewers, selecting programs from the reviewed future program selections which relate to the accessed viewer profiles and issuing program recommendations to the plurality of viewers.

In still another embodiment, the present invention is a system comprising a programming review component for reviewing program metadata, a viewer profile access component for accessing and reviewing viewer profiles and a recommendation engine for selecting programs based on the reviewed program metadata and the accessed viewer profiles.

DETAILED DESCRIPTION OF THE INVENTION

This application incorporates by reference nonprovisional U.S. patent application Ser. No. 10/034,679, which was filed on Dec. 28, 2001 which claims priority to U.S. provisional application Ser. No. 60/282,204, which was filed Apr. 6, 2001, and U.S. provisional application Ser. No. 60/296,436, which was filed Jun. 6, 2001.

Figure 1:
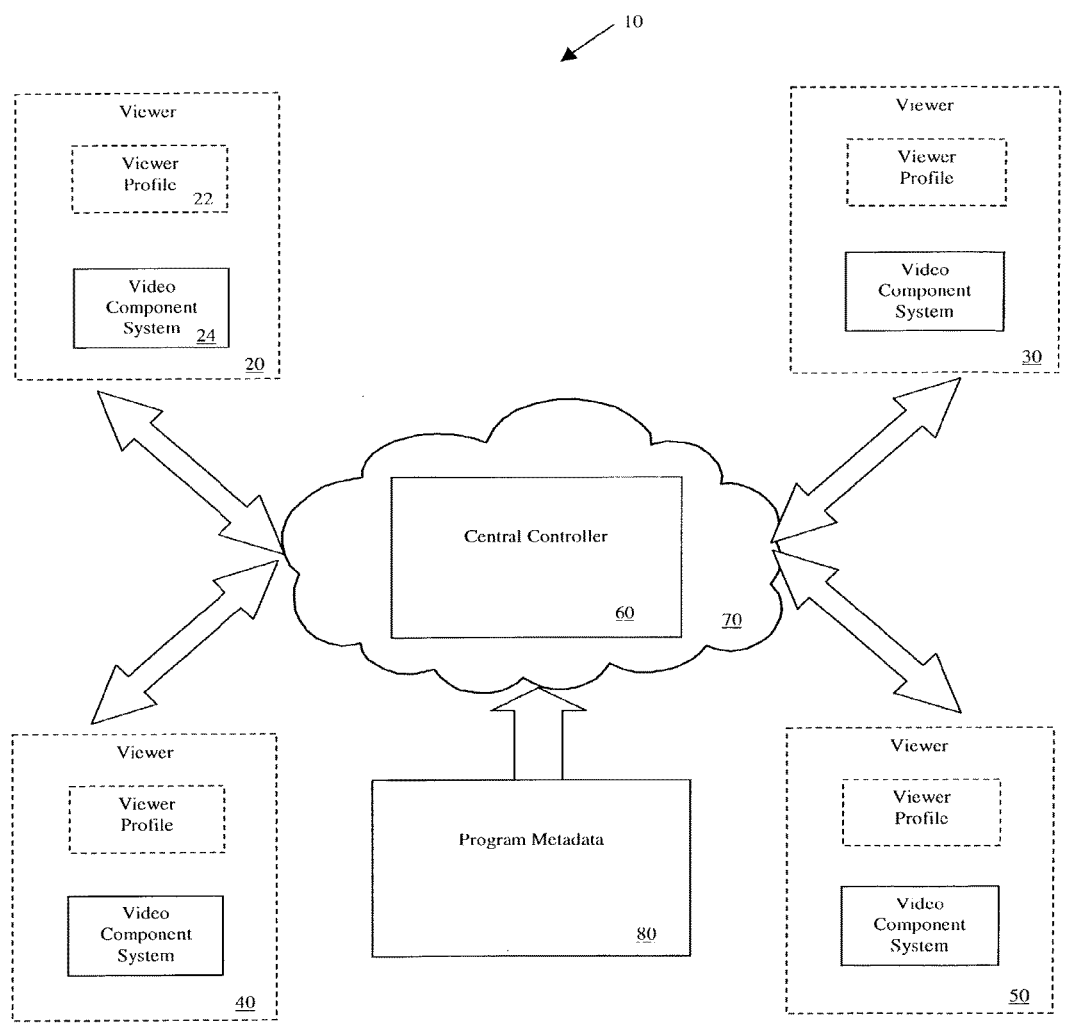
FIG. 1 illustrates an exemplary configuration of a system of the present invention.

Referring to FIG. 1, an exemplary system 10 for providing program recording recommendations based on viewer profiles and reviewed programming content is shown. In one embodiment, system 10 reviews a collection of programming material in order to provide program recommendations to one or more viewers in light of those viewers' profile information. With reference to FIG. 1, system 10 is provided in a generally distributed configuration wherein a multitude of distributed viewers or subscribers 20, 30, 40 and 50 interact and communicate in a two-way fashion with a central program controller 60. Generally, central program controller 60 receives and review program information and provides recommendations based on one or more viewer profiles. Central program controller may be implemented in one embodiment as a computing device or a series of computing devices which communicate with viewers 20, 30, 40 and 50. It is contemplated that any number of viewers are able to communicate with central program controller 60 at any one time and the four illustrated viewers are merely shown for illustrative purposes.

In this embodiment of the present invention, each viewer, such as viewer 20, is associated with a viewer profile 22 which is generally some classification or description of that viewer's viewing history, preferences and/or desires. Each viewer, such as viewer 20, preferably has access to at least one video component system 24 which may include a viewing device, a video interface device such as a settop terminal and a video recording device. Typically the viewing device may be a television, monitor or other device capable of displaying programming in a video format while settop terminal device may be a conventional settop terminal, satellite receiver or other similar device. Video recording device may be a device which is capable of receiving and storing programming on a storage medium such as a rotating type storage drive (e.g., a hard disk drive), a writable digital video disk (DVD) or other type of storage medium.

In the present invention, viewers are enabled to access television programming in a variety of formats such as broadcast video in either live or prerecorded form or other type of programming such as a streamed feed which may be multicast to a number of viewers simultaneously. In the present invention, such programming may be delivered to each viewer via any number of formats and devices including over the air transmissions, microware transmission, cable transmissions, cable/optical fiber transmissions, satellite transmissions, etc. In the present invention, programming can include television, video, radio. Web-based and other forms and types of programming. In this exemplar y scenario, video recorder device is utilized to record certain programs set by the viewer in accordance with the recommendations provided to the viewer(s).

In one exemplary viewer scenario, the viewer would have a monitor or a television set which would be connected to a set-top box. The set-top box would be connected through a coaxial cable to a cable television or broadband network or a satellite dish for "satellite TV." The television set and the set-top box would be located, for example, in a viewer's home and receive a multitude of television channels from a broadcast headend, wherein each television channel has a multitude of programs during a typical day. Also connected to the television and set-top box would be a video recorder device which may be a digital video recorder that includes a hard disk drive for recording and non-volatile storage of television programming. Upon receipt of the programming recommendations, one or more programs may be recorded by the viewer on the viewer's video recorder device.

With reference to FIG. 1, communications between viewers 20, 30, 40 and 50 and central program controller 60 may be accomplished within a network 70. In one embodiment, network 70 transports information, such as viewer profile information from viewers 20, 30, 40 and 50 as well as program recommendations to viewers 20, 30, 40 and 50. Additionally, central program controller 60 receives or accesses program metadata information 80 via network 70. As discussed in more detail later herein, program metadata includes descriptive information about one or more program selections which may be garnered from a variety of information sources. Referring still to FIG. 1, network 70 may include one or more headends associated with one or more of the viewer cable set-top boxes or terminals. Within such a headend, signals to and from the viewers may be encoded/decoded, multiplexed/demultiplexed, managed by a distribution and switching mechanism, combined/decombined and then transmitted to the plurality of viewer set top terminals. In the present invention, the network system may include a combination of telephone lines, wireless such as cellular and microwave technologies, satellites, fiberoptics, coaxial, Personal Communication Networks and similar technology necessary to establish, maintain and/or conduct communications to implement the methods herein.

In the present invention, the network or networks as described herein would be able to provide versatile conduits that may carry, for example, signals to and from the personal video recording devices and a central processor, such as a central program controller. Such signals may be RF signals, Internet Protocol (IP) signals or other multimedia signals which may travel over, for example, the public switched telephone network, Internet, or wireless communication networks. These various network configurations discussed are merely intended as examples of possible network configurations, protocols and architectures for implementation of the present invention but it is contemplated that a variety of other possible configurations, protocols and architectures may be used provided that the viewer profile information and program recommendations are allowed to be sent and transmitted over whatever network configurations, protocols and architectures that may be used.

Figure 2:
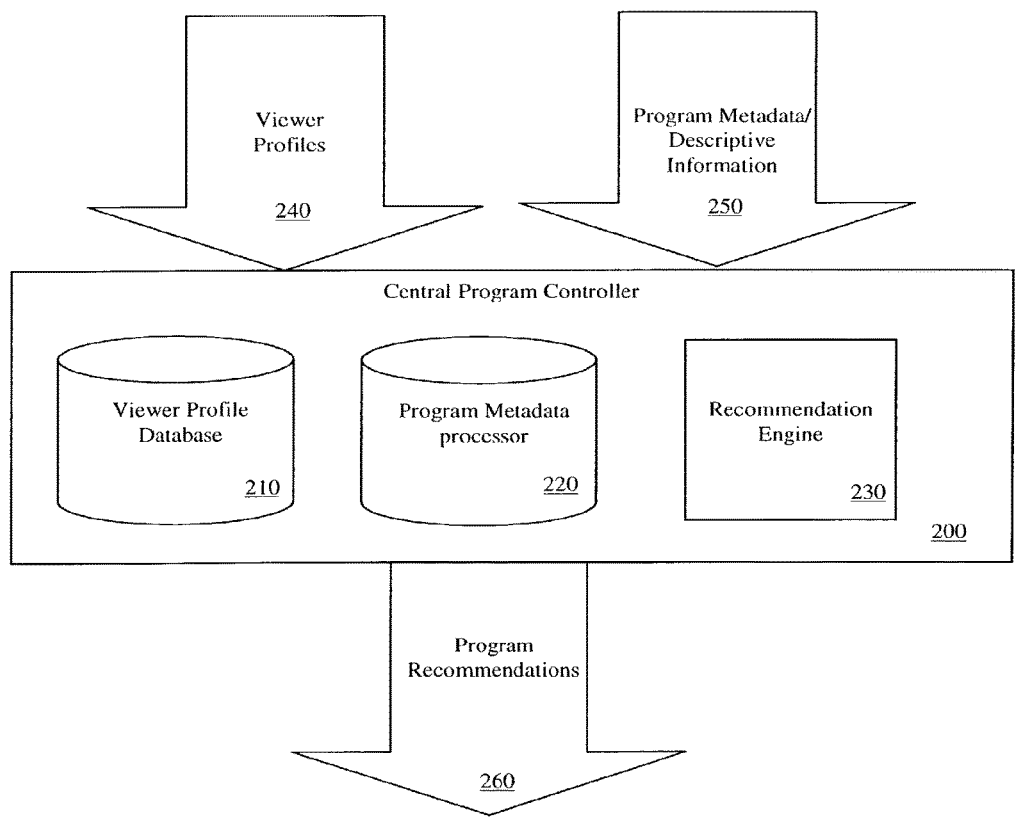
FIG. 2 illustrates an exemplary central program controller in accordance with the present invention.

Referring now to FIG. 2, an exemplary central program controller 200 is shown. In this embodiment, central program controller 200 includes a viewer profile database 210, a metadata processing component 200 and a recommendation engine 230. Viewer profile database 210 may be a localized database, e.g., resident on a local storage device within central program controller 200 or in alternative embodiments, database 210 may be provided on a separate local area or wide area network. In another embodiment, viewer database 210 may also be representative of a number of distributed viewer databases, such as may be provided within each remote viewer's video recorder devices. Additionally, viewer database 210 may be configured as a single database or further be separated into additional sub-databases as necessary.

Still with reference to FIG. 2, viewer database 210 contains information which represents or at least references different viewers and their respective viewing profiles. As discussed earlier herein, the present invention utilizes viewer preferences or profiles to determine which programs or shows to recommend to those viewer(s). In one embodiment of the invention, a profile of the viewer is stored which specifies certain criteria, keywords and/or preferences on which that viewer's profile is based. The criteria may include, for example, previously recorded programming information and/or keywords and/or phrases provided by the user. Previously recorded programming information includes information such as what shows, movies, videos, etc. have been scheduled for recording and any other information related to the shows, movies, videos, etc. such as, for example, the movie title, names of actors/directors/producers and other relevant program/show information which may then form the basis of the viewer's profile. In one embodiment, the profile can be set directly by the viewer via interaction with an appropriately designed graphical user interface (GUI) whereby the viewer may proactively provide certain keywords which describe the viewer's viewing preferences. For example, such keywords may include general classifications such as; drama, comedy, kid, adult, violence, romantic comedy, documentary, sports, news, music videos, history, sitcom, etc. In alternative embodiments, keywords provided by the user may be very specific such as names of actors, directors, producers, set designers, etc. In some embodiments a profile might not be separately stored for a group or an individual. A profile could be inferred by a combination of factors including specific events, geography, time of day, holiday. For example, if an accident occurs in a certain area there could be commands issued to record that news event for everyone in that area. These methods are in contrast to devices such as those provided by Tivo where preferences are based on previous viewing patterns, collaborative filtering and viewer requests. It is contemplated that any type of information which in some manner describes the individual viewer's or group of viewer's preferences is permissible.

In the present invention, the collection and processing of profile information, such as a viewer's history of previously recording programming, occurs in a manner which is transparent to the viewer so that usage of the viewing device and the video recording device is not in any way hampered or interrupted. For example, in an exemplary basic configuration, a viewer does not have to do anything out of the ordinary to communicate such previously recording program information, i.e., the user simply programs the personal video recorder and watches the recorded programming as usual while the information related to such programming is provided to central program controller 60 in a manner discussed in more detail later herein. Of course in instances where the viewer profile is actually created by the viewer, such as by having the viewer submit keywords or describe in detail their preferences, will viewer input be necessary. It is further contemplated that a viewer profile may be created by utilizing a combination of background viewer profile screening, i.e., compiling a history of the viewer's past programming as well and soliciting actual feedback from the viewer as to the viewer's preferences.

In one embodiment of the present invention, central program controller 200 receives and/or collects viewer profile information 240 on either a periodic basis or on a continual basis as is necessary. For example, central program controller 200 may receive or collect program recording information every time a viewer client makes or creates a new program recording entry, i.e., a user programs the personal video recording device to record a show. It is contemplated that other schemes are possible for receiving or collecting program recording information, for example, such information may only be received/collected based on a time interval setting, such as every n number minutes, where n is a real number as determined, for example, by a system operator, or alternatively, such information may be sent every time the user activates the personal video recorder or further, every time information about a particular show/event is desired.

In the present invention, such viewer profile information may be gathered in either a push type manner where data is fed to the central program processor from each viewer, in a pull type manner where the central program processor polls or collects information from each viewer or in a combination a push/pull manner. In another scheme, for example, viewer profile information may be sent every time a new video/program/show is selected, a new scene within a video is selected, or other user operation upon the video is performed such as by rewinding a certain scene or scenes or by skipping over a certain scene or scenes. Additionally, the program recording information gathering may also be characterized as being active, passive or a combination of the two. For example, collection of the recording information from the video recording devices may be accomplished in an active manner whereby central program controller may actively seek out such information from a number of distributed personal video recording devices. Alternatively, such information gathering may be accomplished in a passive manner whereby the central program controller waits and receives viewer profile information in a passive manner from the personal video recording devices.

Referring still to FIG. 2, as viewer profile information 240 is received/collected by central program controller 200, such viewer profile information 240 may then be stored in viewer profile database 210. Furthermore, within central program controller 200, program metadata processor 220 receives and processes program descriptive information 250. In one embodiment, program metadata processor 220 may include or incorporate a video analysis component, for example, to perform scene detection and other functions to analyze program video.

Referring still to FIG. 2, in one embodiment of the present invention, recommendation engine 230 determines personalized recommendations for each viewer separately. Alternatively, viewing recommendations may be determined for a group or community of viewers. In one embodiment, recommendations are determined by compiling viewer profile information associated with one or more viewers and comparing such information to program descriptive information. Recommendations based on the viewer(s) profile and the program metadata/descriptive information may then be made. A number of techniques may be used to match the viewer profile information with the program descriptive information. For example, one or more weighting algorithms may be used to decide which programs best match a viewer's profile so that the best chance of the viewer accepting a selected program is ensured. By way of further example, such weighting algorithms may place more weight in viewer profde information garnered from that viewer's own past recording history and less weight to other factors. In another embodiment, more weight may be given to the viewer's self-created profile, such as keywords provided by the viewer, or demographic information associated with the viewer, such as the viewer's physical address, age, race, religion, sex, etc.

In an exemplary embodiment, normal collaborative filtering algorithms can be used to associate certain viewer profiles(s) with certain program descriptive information in order to determine viewing recommendations in a group or community viewing context. Collaborative filtering techniques are known in the art and are discussed in Goldberg, D., Nichols, D., Old, B. M. and Terry, D. Using Collaborative Filtering to Weave an Information Tapestry. Communications of the ACM, 35, 12 (December 1992), 51-60; Hill, W. C., Stead, L., Rosenstein, M. and Furnas, G. Recommending and Evaluating Choices in a Virtual Community of Use, in Proceedings of CHI95 (Denver Colo., May 1995), ACM Press, 194-201; and Resnick, P., Iacovou, N., Suchak, M., Bergstrom, P., Riedl, J. GroupLens: An Open Architecture for Collaborative Filtering of Netnews, in Proceedings of CSCW94 (Chapel Hill N.C., October 1994), ACM Press, 175-186.

Still with reference to FIG. 2, once recommendation engine 230 determines programs which may match the viewer's profile such program recommendations 260 are provided to the viewer(s). In operation, central program controller 200 provides one or more of program recommendations 260 to the viewer in a manner which is easily reviewed by the viewer. For example, program recommendations 260 may be provided in a dedicated channel which is accessible to the viewer via the viewer's viewing device and settop box. In such an embodiment, the viewer would be able to tune to the dedicated channel and review the program recommendations. In another embodiment, program recommendations may be provided via an alternative delivery process, such as via access to a web site, or an electronic mail delivery or via a speech synthesized message delivered to a message box associated with the viewer, or instant messaging or other push technology. For example, a digitally synthesized message(s) reciting the program recommendation may be delivered to the viewer's voicemail box on an intermittent basis as the program recommendations are determined. Ideally, the program recommendation delivered in this manner would be provided to the viewer well in advance of the scheduled broadcast date and time of the recommended programming. By way of further example, recommendations could be provided in other manners, such as by having a "live" feed of information which may be inserted into current programming the viewer is watching, such as by having a scrolling message appear, for example, at the bottom of the viewer's screen with a series of program recommendations for that day.

Figure 3:
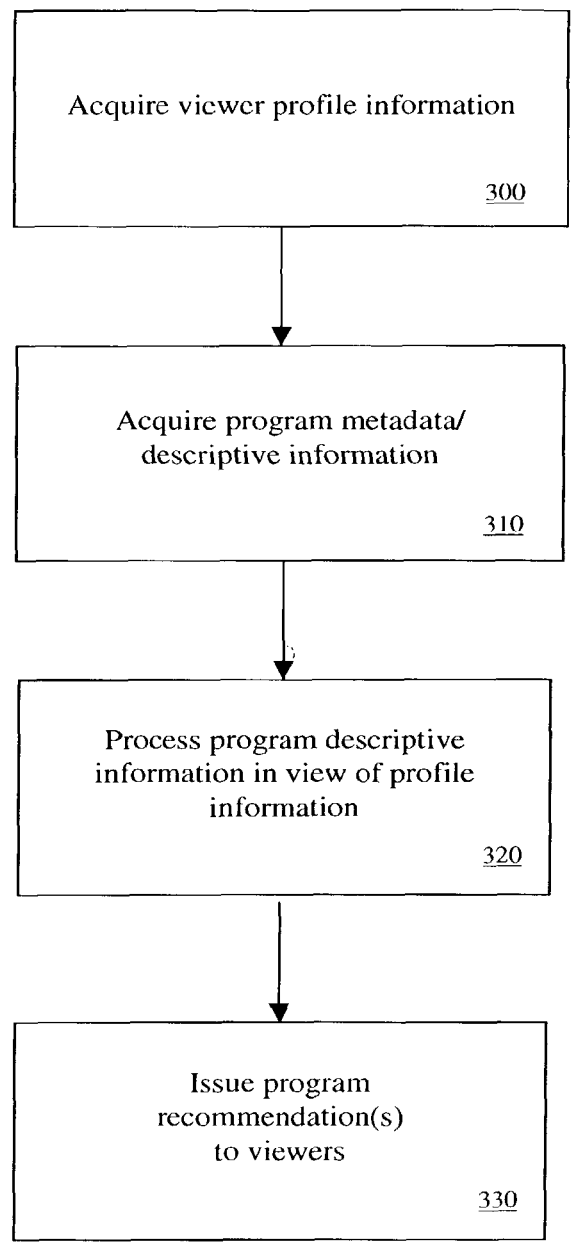
FIG. 3 illustrates an exemplary method in accordance with the present invention.

Referring now to FIG. 3, an exemplary method of the present invention is shown. In this embodiment, viewer profile information is acquired from one or more video recording devices or settop terminals, step 300. As discussed earlier herein, information may be acquired in any number of manners, such as by having the video recording devices or set-top terminals push information to the central program controller or alternatively, by having the central program controller poll the personal video recording devices or set-top terminals for such viewer profile information. Program metadata or description information is then acquired, step 310.

Such program metadata descriptive information may be acquired in a number of manners. In one embodiment, central program controller is provided access to a stored repository of future programming. Such a repository may be searched and reviewed in accordance with techniques discussed herein to determine information about the program content. In another embodiment, program related information may be acquired from one or more electronic program guides which may relay information related to current and future programming to the viewer or other similar sources of program information such as extended data service vertical blanking interval data. In another embodiment, such program descriptive information may be acquired in a real-time manner such as by processing programming on a real time basis to gamer information about the programming. For example, a number of techniques may be employed such as using speech recognition, text/scene analysis, close captioning analysis and other types of similar techniques in order to garner information about the programming on a real time basis. Such programming may be processed in accordance with one or more of the aforementioned techniques in order to obtain information about the program(s) being processed. In another embodiment where actual future programming content cannot be accessed, program previews/trailers for such future programming may be analyzed to determine information about future programming content. Additionally, time zone differences could be used so a program that was broadcast on the east coast could be analyzed ahead of its broadcast on the west coast. All these techniques would define a type of introductory data to a program that we could then analyze as part of creating a recommendation.

Once the viewer profile information and the program descriptive information is received, this information is processed to determine programs which may be suitable for the viewer(s) whose profile information was received, step 320. Again, as mentioned earlier, such profile information may relate to one viewer or a group of viewers who have been joined together as a group or "community of interest". Processing may involve a number of steps such as processing the information to determine which programs may be most desirable to the viewer(s) based on information obtained from their viewer profile. In one embodiment, processing of the viewer profile information and program metadata may be performed in central program controller 200, such as by metadata processing component 220 and a recommendation engine 230 within central program controller 200. Once the information is processed, program recommendations are issued to the viewer(s), step 330.

Figure 4:
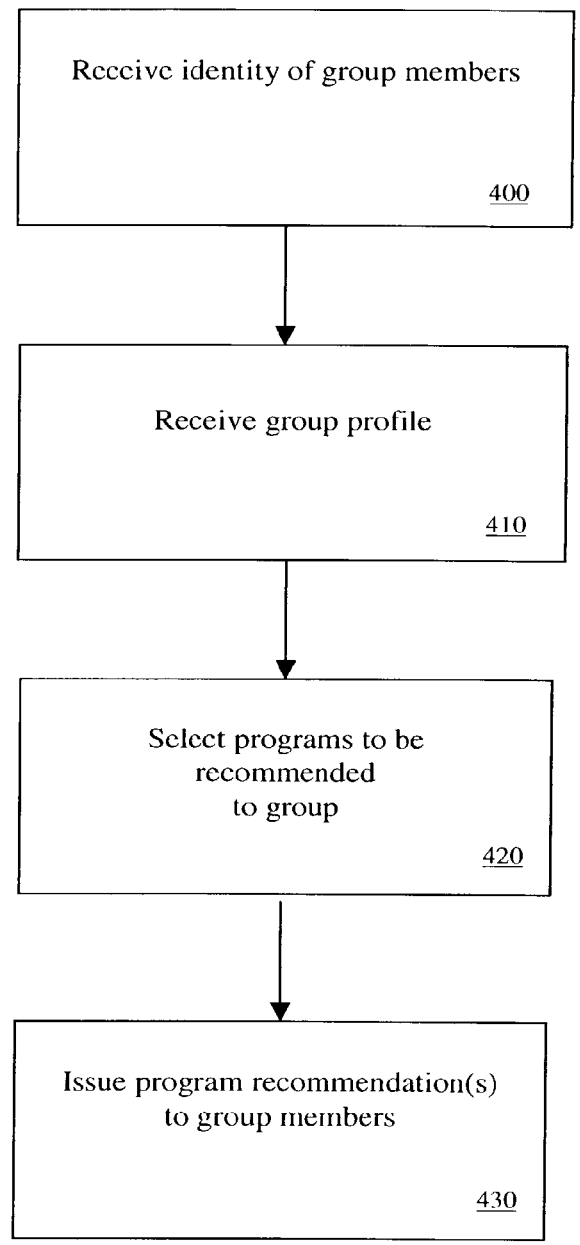
FIG. 4 illustrates another exemplary method in accordance with the present invention.

Referring now to FIG. 4, another exemplary method of the present invention is shown with general applicability towards a group or community of viewers. In this embodiment, the identity of group members is determined, step 400. For example, a number of viewers may organize a group and designate the members to the central program controller. Such a designation may be via an appropriate GUI, such as one provided via each viewer's subscription cable system which is in communication with the central program controller or such a provision may be made in a more rudimentary fashion, such as via a telephone based system which communicates with the central program controller. Once the group members are identified, the group profile is then determined, step 410. For example, in one embodiment, the profile of a single member of the group may be used to determine which programs to record for the group. In an alternative embodiment, the profiles of each group member may be used to determine a group profile and the aggregated group profile used to determine which programs to record for the group. Other variations in these group scenarios are contemplated and possible. Once the group profile is determined, programs to be recommended to the group are selected, step 420. Once the programs to be recorded are selected, program recommendations are issued to the group members, step 430. It is contemplated that in the present invention, viewers may also receive group based programming recommendations as well as individually tailored programming recommendations simultaneously.

While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation or material to the teachings of the invention without departing from the scope thereof.

For example, while the teachings here are discussed primarily with reference to television programming, the present inventive teachings may be easily applied to other types of programming such as radio programming and other types of programming where viewer profiles or preferences may be collected and programming recommendation can be made. By way of further example, the present inventive teachings may be modified by having a plurality of program selections reviewed contemporaneously with the broadcasting of the program selections in a first geographic area and the programming recommendations provided to a plurality of viewers in a second geographic area. More specifically, broadcasting information may be reviewed and processed in one time zone, in order to provide recommendations to viewers in another time zone.

By way of further example, while the teachings here are discussed primarily with reference to viewer profiles which express a viewer's preferences in a positive type fashion, such as what types of programming the viewer likes, it is contemplated that the profiles may be provided in a negative type fashion where the viewer may indicate programming that the viewer does not like or does not want to see. With respect to all embodiments shown and described herein, it is intended that the invention not be limited to the particular embodiment disclosed, but that the invention will include all embodiments falling within the scope of the appended claims.

What is claimed is:

1. A method of operation of a central program controller, the method comprising:
reviewing program recordings previously scheduled by a user via a video recording device;
generating a profile using a weighted algorithm, the profile based on a specific event occurring in a certain area, user identified preferences, and the program recordings previously scheduled by the user, the weighted algorithm assigning more weight to the program recordings previously scheduled by the user than the user identified preferences;
deriving metadata for a plurality of programs;
comparing the profile to the metadata;
selecting one of the plurality of programs based on the comparing to generate a program recommendation; and
transmitting the program recommendation to the video recording device.

2. The method of claim 1, wherein the deriving metadata comprises deriving the metadata contemporaneously with a broadcasting of the one of the plurality of programs in a first geographic area.

3. The method of claim 2, wherein the video recording device is located in a second geographic area, and the program recommendation is transmitted to the video recording device before a broadcast of the one of the plurality of programs is transmitted to the second geographic area.

4. The method of claim 1, wherein the profile is further based on a user action comprising one of selecting a new program, selecting a scene of a specific program, rewinding the scene, and skipping the scene.

5. The method of claim 1, wherein the profile is further based on a time of day.

6. A central program controller comprising:
a processor; and
a memory to store computer program instructions, the computer program instructions when executed on the processor cause the processor to perform operations comprising:
reviewing program recordings previously scheduled by a user via a video recording device;
generating a profile using a weighted algorithm, the profile based on a specific event occurring in a certain area, user identified preferences, and the program recordings previously scheduled by the user, the weighted algorithm assigning more weight to the program recordings previously scheduled by the user than the user identified preferences;
deriving metadata for a plurality of programs;
comparing the profile to the metadata;
selecting one of the plurality of programs based on the comparing to generate a program recommendation; and
transmitting the program recommendation to the video recording device.

7. The central program controller of claim 6, wherein the deriving metadata comprises deriving the metadata contemporaneously with a broadcasting of the one of the plurality of programs in a first geographic area.

8. The central program controller of claim 7, wherein the video recording device is located in a second geographic area, and the program recommendation is transmitted to the video recording device before a broadcast of the one of the plurality of programs is transmitted to the second geographic area.

9. The central program controller of claim 6, wherein the profile is further based on a user action comprising one of selecting a new program, selecting a scene of a specific program, rewinding the scene, and skipping the scene.

10. The central program controller of claim 6, wherein the profile is further based on a time of day.

11. A non-transitory computer readable medium storing computer program instructions for operation of a central program controller, which, when executed on a processor, cause the processor to perform operations comprising:
reviewing program recordings previously scheduled by a user via a video recording device;
generating a profile using a weighted algorithm, the profile based on a specific event occurring in a certain area, user identified preferences, and the program recordings previously scheduled by the user, the weighted algorithm assigning more weight to the program recordings previously scheduled by the user than the user identified preferences;
deriving metadata for a plurality of programs;
comparing the profile to the metadata;
selecting one of the plurality of programs based on the comparing to generate a program recommendation; and
transmitting the program recommendation to the video recording device.

12. The non-transitory computer readable medium of claim 11, wherein the deriving metadata comprises deriving the metadata contemporaneously with a broadcasting of the one of the plurality of programs in a first geographic area.

13. The non-transitory computer readable medium of claim 12, wherein the video recording device is located in a second geographic area, and the program recommendation is transmitted to the video recording device before a broadcast of the one of the plurality of programs is transmitted to the second geographic area.

14. The non-transitory computer readable medium of claim 11, wherein the profile is further based on a user action comprising one of selecting a new program, selecting a scene of a specific program, rewinding the scene, and skipping the scene.

15. The non-transitory computer readable medium of claim 11, wherein the profile is further based on a time of day.

* * * * *